Dec. 26, 1961
G. H. McLAUGHLIN ETAL
METHOD AND MEANS OF PROSPECTING FOR
ELECTRICALLY CONDUCTING BODIES
3,015,060
Filed Oct. 15, 1954
3 Sheets-Sheet 1
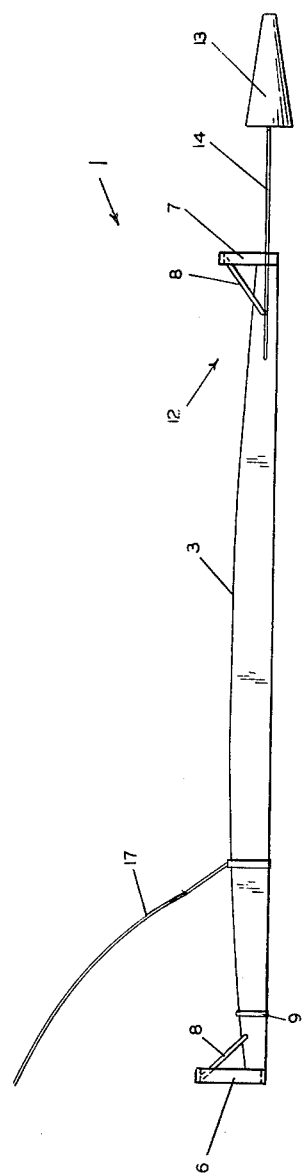
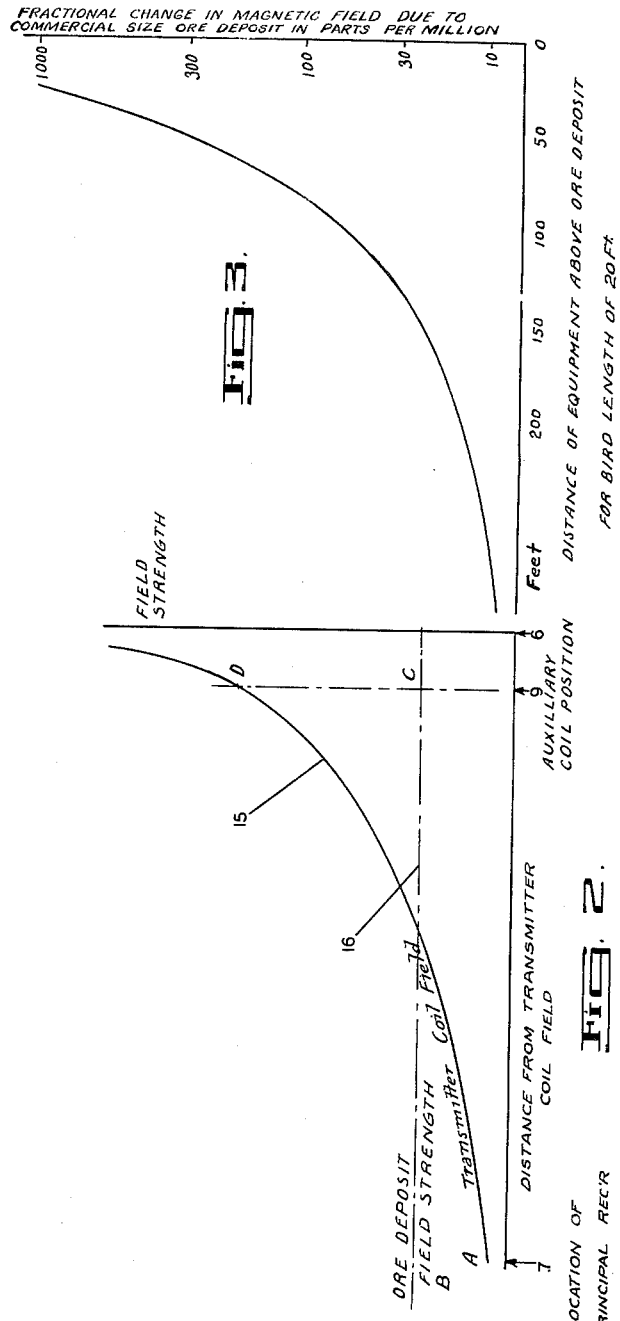
INVENTORS
GEORGE H. McLAUGHLIN
HERBERT A. HARVEY
WILLIAM O. CARTIER
WILLIAM A. ROBINSON
Douglas S. Johnson
ATT'Y

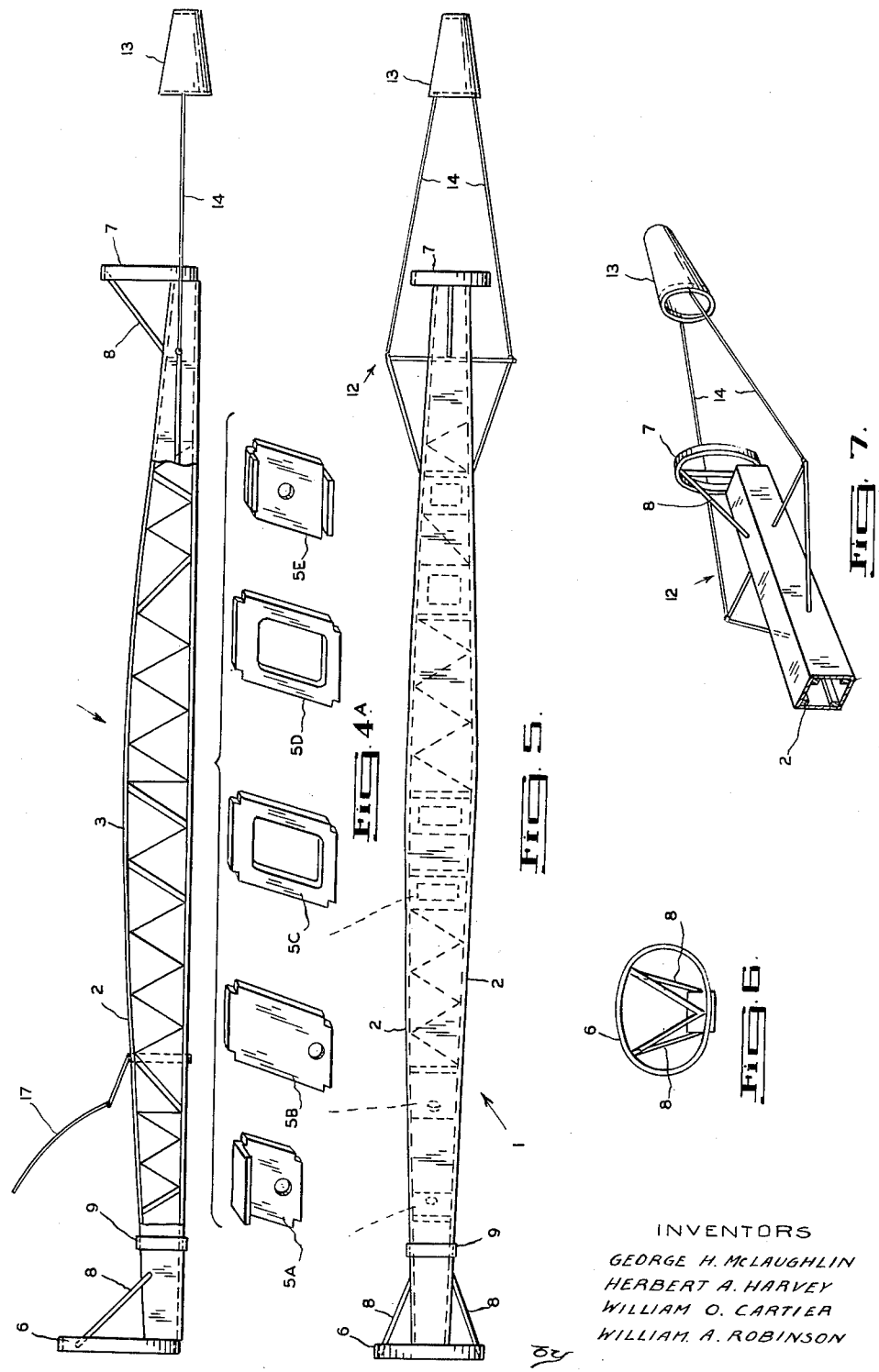

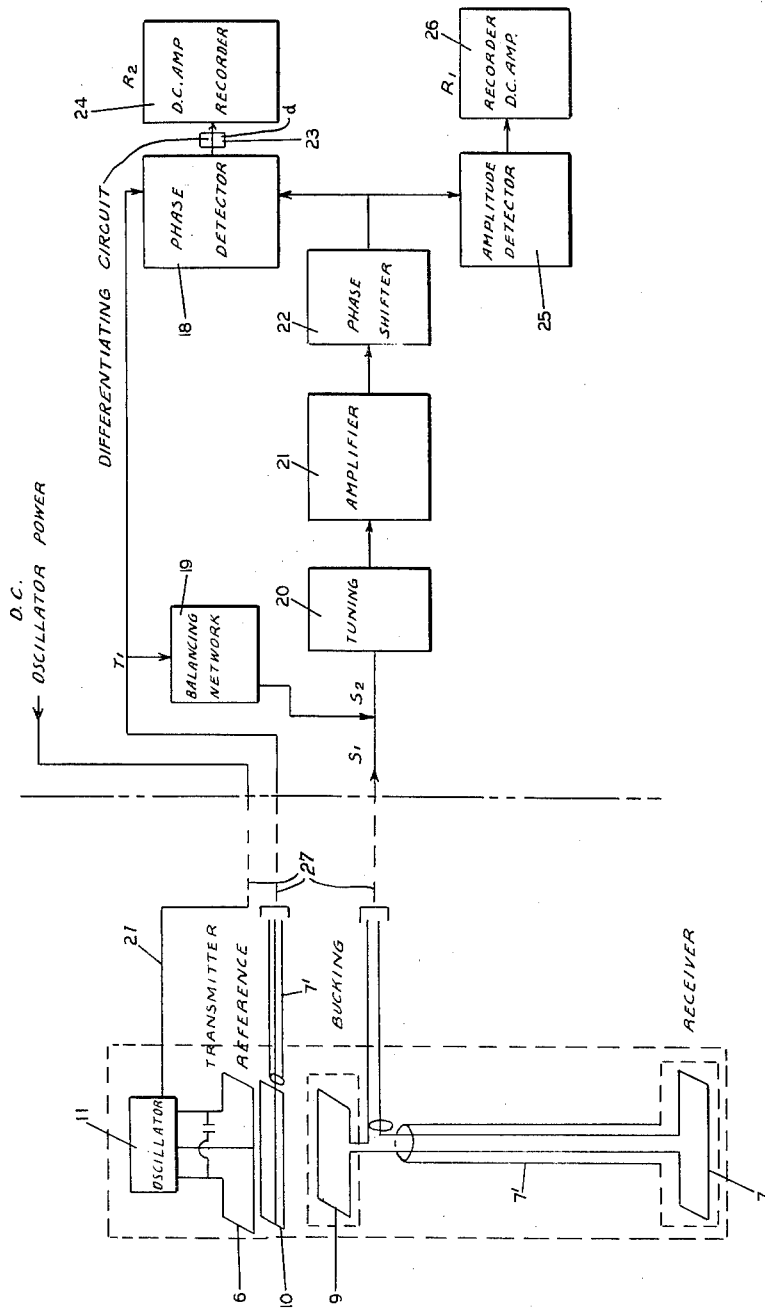

_United States Patent Office_

3,015,060
Patented Dec. 26, 1961

3,015,060
METHOD AND MEANS OF PROSPECTING FOR ELECTRICALLY CONDUCTING BODIES
George H. McLaughlin, Herbert A. Harvey, William O. Cartier, and William A. Robinson, Toronto, Ontario, Canada, assignors, by mesne assignments, to Nucom Limited, Toronto, York, Ontario, Canada
Filed Oct. 15, 1954, Ser. No. 462,574
18 Claims. (Cl. 324—4)

The object of this invention is to provide a reliable method and a means for rapidly and cheaply exploring the earth's upper crust for electrically conducting ore deposits.

The majority of previous methods which have been ground methods created an alternating low frequency magnetic field throughout the area to be investigated, surveyed along lines cut through the forests and measured variations in the alternating magnetic field as an indication of the presence of electrically conducting bodies. With such methods a party of three men with equipment could cut and prospect over an average of about thirty acres per day. A method so slow and costly is unsuitable to prospecting large areas of potential mining territory.

Certain airborne methods have been developed to overcome these limitations. In general these methods create an alternating magnetic field from an aircraft and measure variations in the alternating magnetic field with equipment mounted in a bird towed several hundred feet below the aircraft to indicate the existence of electrically conducting ore deposits in the earth's crust. The magnitude or direction of the alternating magnetic field created at the aircraft and measured at the towed bird is dependent on the relative distance between the aircraft and the bird and on the angle of the aircraft relative to the bird. These two latter sources of variation in the measured magnetic field can be indistinguishable from those caused by the desired ore deposit thereby providing serious sources of error and rendering results provided by such methods inconclusive.

In an effort to overcome these limitations, these airborne methods employ a means intended to cancel the field variations arising from the variations in relative distance or direction of aircraft and birds. The major cause of such variations is the existence of "bumps," or unevenness in the air through which the aircraft and bird travel.

In some methods two different frequencies are employed such that spatial variations between aircraft and bird produce the same effect at each frequency while electrically conducting ore deposits produce a different effect at each of the two frequencies. The response of an electrically conducting ore deposit can then be distinguished from the response produced by spatial variations between aircraft and birds by using this difference between the responses to the two frequencies.

In practice these methods are only partially successful. The effect of variations in relative position of aircraft and birds are cancelled to an acceptable degree only in calm weather such as in the early morning hours of the day with a consequent restriction on operational time for the equipment.

Furthermore inasmuch as such methods have had to be carried out with aircraft which must maintain an air speed of the order of 90 miles per hour, in order to examine the ground where indications of ore are obtained a complicated system is employed of locating the points of interest from air photographs made simultaneously with the geophysical measurements. Then a ground party must be sent in later to examine the area.

Another disadvantage of these methods lies in the existence of "blind spots." For some of the aircraft methods no response is obtained if the flight path is made perpendicular to the axis of the ore deposit; for other of the methods no response is obtained unless the operating frequencies are correctly chosen relative to the magnitude of the electrical conductivity of the ore deposit. In either a difficulty exists since neither the direction of the ore deposit, nor its electrical conductivity are known until the deposit is discovered and examined.

It is the object of the present invention to overcome the disadvantages presented by the prior art airborne methods.

More particularly it is the object of the invention to eliminate the major source of error caused in the prior art airborne methods caused by the relative movement of the aircraft and bird.

Another important object is to devise a method and means of prospecting which will eliminate the necessity of the previously required long towing cables connecting the bird to the aircraft whereby a helicopter may be employed and the equipment required to carry out the method may be trailed in close proximity to the helicopter to allow the topography of the area being investigated to be closely followed and the distance of the detecting equipment from the ground to be closely ascertained.

By enabling the use of a helicopter to carry out the present invention it will be understood that large areas can be quickly explored and when indications of a conductor anomaly are detected the helicopter may be maneuvered slowly in the vicinity of the anomaly or caused to hover over a particular location to provide extensive and reliable information concerning the anomaly eliminating the prior problems of trying to correlate the results achieved from the aircraft with the ground positions.

In this regard it is to be noted that it has not heretofore been possible to safely fly a bird of any appreciable size with a helicopter as the bird becomes dangerously unmanageable and it is a particular object of this invention to provide a bird which can be safely used with a helicopter and requires a relatively short towing cable.

Again it is an important object to provide a method and apparatus for electromagnetic prospecting which will not only be extremely reliable but which will have an exceedingly high sensitivity.

Still a further object is to effectively discriminate against temperature and other long time gradual effects which tend to interfere with the effects produced by the presence of conductor anomalies.

One important feature of the invention resides in mounting a transmitting coil and a receiver coil together on a beam structure adapted to be trailed from a helicopter with the beam maintaining the coils in fixed relative relation at all times during flight. Thus the receiver coil is arranged to measure the electromagnetic field created by the transmitter in a direction fixed with respect to the direction of the created field and at a fixed distance therefrom.

Another important feature resides in employing a bucking or auxiliary receiver coil connected in opposition to the main receiver coil, the sensitivity and disposition relative the transmitting coil of the main or measuring receiver coil and the bucking or auxiliary receiver coil being such that the bucking coil cancels out substantially all direct pick-up of the main receiving coil in the absence of a conductor body but has substantially no cancelling effect on the electromagnetic field variations caused by the presence of a conductor body.

Thus the present invention provides for eliminating to a high degree effects on the system giving rise to even small variations in the generated electromagnetic field other than variations due to conductor bodies so that such latter variations are not masked or lost in the presence of other effects.

Another feature of the invention resides in constructing the beam to provide for the permissible payload of the aircraft a beam structure having maximum length consistent with the stiffness of the beam required to maintain the coils in fixed relative relation.

According to the preferred form of the invention the coils are disposed on the beam in coaxial arrangement and with their axes disposed substantially on the axis of the beam to minimize effects of twisting or bending.

Still another important feature resides in trailing from the beam a stabilizing device in the form of a wind sock which it has been discovered will stabilize the beam in flight at the end of a relatively short length of cable enabling the advantageous employment of the helicopter as noted above.

Another feature of the invention resides in differentiating the relatively rapid field variations due to the passage of the aircraft over a conductor body from the long-term changes such as caused by temperature variations so that such further source of errors is eliminated.

The invention will be more fully understood from the following detailed description, taken in conjunction with the accompanying drawings in which FIGURE 1 is a side elevational view of the bird in the form of a longitudinal beam structure to be towed by a helicopter in accordance with the invention.

FIGURE 2 is a diagram illustrating the physical relationships of the transmitting and main and auxiliary coils on the beam together with a graph of the field strength at the main and auxiliary receiver coils caused by the transmitter coil and ore deposit respectively.

FIGURE 3 is a graph illustrating the change in magnetic field due to the presence of a commercial ore deposit for different distances of the beam above the deposit.

FIGURE 4 is an enlarged side elevational view, partly broken away, of the beam structure of FIGURE 1.

FIGURE 4A is a perspective view illustrating the various bulkheads used in reinforcing the beam structure of FIGURE 4.

FIGURE 5 is a plan view of the beam of FIGURE 4.

FIGURE 6 is a front elevational view of the beam.

FIGURE 7 is a fragmentary perspective view of the rear of the beam showing its construction, and illustrating the trailing wind sock stabilizer.

FIGURE 8 is a block diagram of the electrical circuit arrangements, for carrying out the invention.

Referring first to FIGURES 1, 4 and 5, the bird to be towed behind the helicopter and generally designated as 1, is in the form of a longitudinal beam structure comprising longitudinal stringers 2, preferably of Sitka spruce which can be obtained in the lengths required without knots or other imperfections. The upper stringers are preferably bowed slightly as at 3. To increase the rigidity of the structure a series of struts 4, and bulkheads 5A, 5B, 5C, 5D, and 5E, as shown in FIGURE 4A, are secured between the stringers to secure and support them in beam forming relation.

The bird or beam 1 is constructed as long as possible consistent with a very high degree of rigidity and the pay-load that the helicopter can carry. It has been found in practice that it is possible to construct a beam of the order of 20 feet in length while maintaining the high degree of rigidity desired and still enable the beam to be air-borne by a helicopter. Secured at the leading end of the beam is a transmitting coil 6, while at the trailing end is mounted a detecting or receiver coil 7. Suitable braces 8, are employed to hold the coils 6 and 7 rigidly on the beam with the axes of these coils coaxial. Secured on the beam adjacent to the transmitting coil 6 is a bucking or auxiliary receiver coil 9. The main receiver coil 7 and bucking coil 9 are shielded by suitable shielding 7' to prevent capacitive coupling with the transmitting coil 6. The coil 9 again is arranged with its plane parallel to the planes of the coils 6 and 7, and generally coaxial therewith.

A fourth coil 10, forming a reference coil, is formed by a separate turn on the transmitting coil form and is indicated in FIGURE 8. In order to protect the coils 6 and 7 on landing of the beam, the beam axis is lowered below the coil axes but is maintained as nearly coaxial therewith as can be arranged consistent with coil protection. With the relationship of the coils as described and illustrated, the receiver is at a fixed distance from the transmitter, and is arranged to measure the electromagnetic field in fixed directions, set up upon energization of the transmitter coil, by a suitable oscillator 11 with stabilized output. The generally coaxial relation of the coils and beam structure minimize any changes in separation or relative disposition of the coils upon twisting or bending of the beam in flight. These are the directions of least resistance in a beam structure.

The beam 1 may be, if desired, provided with a tail assembly and trailing the beam as illustrated in FIGURES 1 and 7 is a conical sleeve or wind sock 13, secured to the tail of the beam by suitable cables 14 held apart by a spreader bar 12 to prevent jarring the receiver coil 7.

As will hereinafter appear, the sensitivity of the equipment is dependent on the separation of the receiving and transmitting coils 7 and 6, and as pointed out above, the beam 1 is made as long as possible consistent with the requirements for rigidity. While the design of birds for towing from conventional aircraft has been successfully accomplished, such prior art structures are not suitable for flying a long beam or bird, as above described, from a helicopter. Further, in order to most advantageously employ the present invention, it is desirable that the helicoper be able to fly close to the ground at a height of the order of 100 feet so that the bird is required to be towed on a relatively short cable of the order of 50 feet as compared to a cable length of about 500 feet used in present methods with conventional aircraft application. Moreover, it is required that the helicopter operate over a wide speed range from 0 while hovering to about 100 miles per hour. The conventional aircraft used for towing birds in previous methods has had a minimum air operating speed of the order of 90 miles per hour and normally would fly at something over 100 miles per hour.

Due to the long length of the bird required in accordance with the present invention, the ratio of surface area to weight is very much higher than in the case of a bird used with conventional aircraft. As a result, it was found in attempting to employ the present method and equipment in its optimum form that a long bird of the order of the length of the bird above described was quite unmanageable, and would swoop violently from side to side, and up and down on its short cable to such a degree that it would become dangerous to the helicopter, requiring that its cable be severed to save the aircraft. It has been discovered that the used of the conical sleeve or wind sock, 13, provides a stabilization to the beam in a manner similar to that of a sea anchor, adding effective air resistance which acts to damp out oscillations of the bird. The ability of the wind sock to so control the bird, moreover, is effective irrespective of the direction of movement of the bird, and dependent only upon its air speed.

As is well understood by those skilled in the art, except at high frequencies the field strength of an electromagnetic field falls off inversely as the cube of the distance from the source. FIGURE 2 illustrates at 15 the curve of field strength plotted against distance from the field source. The arrows 6, 7 and 9 illustrate the relative positions of the transmitter, main receiver and auxiliary receiver coils, respectively. Suppose by way of illustration, the auxiliary coil 9 is located at one-tenth the distance from the transmitting coil 6 as is the main receiver coil 7, that is, in the particular beam illustrated, the auxiliary receiver or bucking coil 9 is located at 2 feet from the transmitting coil. Because of the physical relationship of the coils, therefore, the field strength D, due to the transmitting coil, will be one thousand times as great at the position of the auxiliary coil 9 as the field strength A will be at the position of the main receiver coil 7. In the particular example illustrated, however, the auxiliary coil 9 is designed to have 1/1000 of the sensitivity of the main receiver coil 7. Thus the amplitude of the signals generated by the coils 7 and 9 will be the same.

Suppose the auxiliary receiver coil is displaced so that the field strength it experiences at D is 999 times the strength of the field at A, the theoretical figure of precisely 1000 times being impractical to achieve. Assume then that the dotted line 16 indicates the field strength due to the presence of a conductor ore body beneath the beam i.e., the secondary field created by the effect of the primary field from the transmitter coil inducing eddy currents in the ore body. Since for all practical purposes, the main and auxiliary receiver coils 7 and 9 are the same distance from the ore deposit, which may be considered as a secondary source setting up a secondary electromagnetic field, this line 16 is parallel to the abcissa and is the same value indicated at B at coil 7, as indicated at C, the position of coil 9. In the presence of a conductor ore deposit, therefore, the signal generated in the main receiver coil considering the sensitivity of this coil as unity is as follows:

$$R_s = A + B$$

The signal generated in the auxiliary coil 9 will be as follows:

$$A_s = D + C$$

Considering that the auxiliary coil 9 has a sensitivity one thousand times less than the sensitivity of the main receiver 7, then the signal generated in the auxiliary coil 9 may be expressed:

$$A_s = \frac{999}{1000}A + \frac{B}{1000}$$

Upon subtracting the two signals, we have:

$$A + B - \frac{999}{1000}A - \frac{B}{1000} = \frac{A}{1000} + \frac{999}{1000}B$$

which is approximately equal to $$B + \frac{A}{1000}$$

and it is evident that the effect of the total ore deposit is measured while the variation of the source will be reduced by one thousand times. Thus, in the specific example given, with the particular beam length and coil relationships, the main or principal receiving coil 7 will measure the transmitted field and the variation caused by an ore deposit, whereas the auxiliary coil will measure nearly the same amplitude of transmitted field but only 1/1000 part of the variation caused by an ore deposit. The difference between these two signals will contain the variation from ore deposits, but only 1/1000 part of any variation due to the transmitted field source or deflection of the beam.

The difference in signal between the two receiving coils is passed up to the helicopter by means of suitable electric wires in the towing cable 17 to the circuit components carried in the aircraft and illustrated in FIGURE 8.

It will be appreciated that the value of one thousand used in the above example is arbitrary, and other values could be used, depending on the necessary sensitivity of the equipment.

At the same time that the resultant signal of the main and auxiliary receiver coils 7 and 9 is fed to the aircraft, a reference signal from the reference coil 10 is also fed to the aircraft and delivered to a phase detector 18. Inasmuch as it may be difficult to obtain the physical relationships of the transmitter coil 6 and main and auxiliary receiver coils 7 and 9 with sufficient accuracy to provide precisely the correct degree of cancellation of the direct field pick-up by the main receiver, a small portion of the reference signal $T_1$ is delivered through a balancing network 19 and mixed with the resultant signal $S_1$ from the two receiver coils to provide in the resulting signal $S_2$ the exact degree of cancellation desired. The signal $S_2$ is fed through a tuning circuit 20, tuned to the frequency of the transmitter, and is then delivered through an amplifier, 21 and a phase shifter 22, the output from which is delivered up to the phase detector 18 which can select the in-phase or any other phase component of the resultant signal $S_2$ as required.

From the phase detector 18 the signal is delivered through a differentiating circuit 23 to a D.C. amplitude recorder 24, which may form a recording stylus. Inasmuch as under flight at normal speed of the helicopter, conducting ore bodies will show up as changes that will take place over 1/10 of a second, the differentiating circuit 23 is designed so that it will eliminate from the signal fed to the recorder 24 changes that take place over longer than four seconds. Thus the discriminating or differentiating circuit 23 discriminates against temperature changes and other long-time gradual effects.

From the phase shifter 22 a portion of the signal is also fed to an amplitude detector 25, and again to a recorder 26, corresponding to the recorder 24. Thus both the amplitude of the resultant signal and the amplitude of an in-phase or any other phase component of the resultant signal can be simultaneously recorded.

The circuits of the various components 18 to 26 may be conventional circuits and their construction and operation will be well known to those skilled in the art.

The power for the oscillator 11, mounted on the beam, is delivered through electric wires 27 included in the towing cable, from the aircraft.

In operation, the bird or beam 1 is towed on the cable 17 which preferably has a length of approximately 50 feet and the helicopter is flown at a height of about 100 feet from the ground. FIGURE 3 shows the relationship between the change in magnetic field due to a commercial size ore deposit plotted against distance of the beam above the ore deposit for a beam or bird length of 20 feet. Generally similar curves will of course be obtained for beams of differing lengths. Due to the presence of the wind sock 13, even on such a short cable length, the bird is quite manageable at all speeds, and in addition, it facilitates parking of the bird, which can be lowered vertically downwardly by the helicopter, and then the helicopter flown a short length ahead of the beam and landed. Further, the short cable enables the height of the bird from the ground to be closely gauged.

As the aircraft moves over the area to be investigated, when it crosses a conductor body such as a commercial size ore body, there will be a substantial variation in the electromagnetic field caused by the presence of the ore body. As pointed out above in connection with the explanation of FIGURE 2, the effect of this variation due to the presence of the ore body on the low sensitivity auxiliary receiver coil 9 will be insignificant in comparison with the result it will have on the main receiver 7. Therefore, a variation in the resultant signal $S_1$ will be delivered up to the aircraft and it can then be measured for amplitude and phase. On the other hand, during flight, variations may occur caused by slight deflections of the beam or change in the field strength created by the transmitter coil 6. These variations will be almost completely cancelled out by the opposing main and auxiliary receiver coils 7 and 9 so that their effects will be ignored by the measuring equipment in the aircraft to such an extent that they will not mask out changes caused by the presence of a conductor body. When the equipment in the aircraft indicates the presence of a conductor body, the aircraft can then be manoeuvered to obtain maximum signal by hovering over the general area, and if desired at the time, a crew member can be lowered to accurately mark the location or to carry out ground tests.

The frequency at which the equipment is operated is chosen so that it suits the general type of ore deposit for which the search is being conducted. In most mining regions copper, lead and silver ores are very good electrical conductors and the frequency can be chosen as low as 100 cycles, but in some areas these ores are relatively poor electrical conductors and a frequency of several thousand cycles per second is then employed. In general, the frequency should be as low as possible to minimize the influence of wet clay and muskeg, which form weakly conducting regions of no economic value.

As the ground is a poor conductor, it produces some signal which is out-of-phase with the source signal. By adjusting the phase sensitivity of the phase detector 18 it is possible to distinguish between ground signals and those produced by good conductors producing in-phase signals.

It has been found that the in-phase component of the ground is no longer present once the beam is higher than 10 feet above the ground, so that in carrying out the present invention, the in-phase component of the ground has no significant effect as the beam is flown from the helicopter.

When the frequency is properly chosen to give maximum response from a particular ore deposit, the response is in the same phase as the transmitter field. When the frequency is too low for the conductivity of a particular ore deposit, the response will include a component 90 degrees out-of-phase with the transmitted field. Thus, some information about the conductivity of an ore deposit can be determined by measuring the in-phase and out-of-phase components or by conducting the measurements simultaneously at more than one frequency.

With the circuit components illustrated, the in-phase or out-of-phase component of the response can be determined and it will be understood by those skilled in the art that a corresponding system may be operated on two different frequencies. It is to be understood that while the helicopter is hovering, the differentiating circuit 23 will be rendered inoperative, so that the effects of the ore body will not be ignored.

What we claim as our invention is:

1. A method of prospecting for electrically conducting bodies in the earth from an aircraft comprising flying an electromagnetic field source above the ground while energizing said source to set up a low frequency alternating electromagnetic field, simultaneously detecting said electromagnetic field at two fixed points located at different distances from said source by means of substantially coaxial detectors having sensitivities directly proportional to the cube of their respective distances from said source, and comparing the responses of said detectors.

2. A method of prospecting for electrically conducting bodies in the earth from an aircraft comprising flying an electromagnetic field source above the ground while energising said source to set up a low frequency alternating electromagnetic field, simultaneously detecting said field at two different points substantially on the axis of said source by means of detectors having their sensitivities directly proportional to the cubes of their distances from said source and connected in opposition, and measuring any resultant response as an indication of the presence of a conductor anomaly.

3. A method of prospecting for electrically conducting bodies comprising towing a low frequency alternating electromagnetic field source and detector means for detecting variations in a field created by said source from an aircraft while maintaining said source and detecting means in precisely accurate fixed relation relative to each other at all times during flight, measuring field variations detected by said detecting means and passing such field variations measured up to the aircraft.

4. A method as claimed in claim 3 in which said field source and detector means are towed from a helicopter and maintained in coaxial relation and said helicopter is flown over an area to be investigated to detect variations in the created electromagnetic field and is then caused to hover in the vicinity of the point of field variation detection whereby the point may be accurately pin pointed.

5. A method of prospecting for electrically conducting bodies in the earth from an aircraft comprising towing by means of the aircraft a source from which a low frequency alternating electromagnetic field is created and a pair of detecting devices maintained in a fixed coaxial relation relative to said source and at different distances from said source, said detecting devices having their sensitivities directly proportional to the cubes of their distances from said source and being connected in opposition, and detecting the resultant response in the aircraft to ascertain variations therein as an indication of the presence of a conductor body in the vicinity beneath the aircraft.

6. A method as claimed in claim 5, including the further step of differentiating the resultant response from said detector devices to eliminate therefrom the effect of changes having a period of the order of several seconds or longer.

7. Means for electromagnetic prospecting comprising a longitudinal beam structure, adapted to be towed by an aircraft, a transmitter coil to create a low frequency alternating electromagnetic field mounted on said beam structure means for energizing said coil, a receiver coil mounted in a fixed relation to and at a fixed distance from said transmitter coil on said beam structure, means responsive to the signal generated in said detector coil to indicate variations in the field received thereby, and a wind sock to stabilize said beam structure in flight.

8. Means for prospecting for electrically conducting bodies from an aircraft comprising a longitudinal beam structure adapted to be towed by a helicopter, a transmitter coil mounted on said beam structure, means for energizing said transmitter coil to create a low frequency alternating electromagnetic field, a receiver including a main receiver coil mounted in a fixed relation to and at a fixed distance from said transmitter coil on said beam structure, an auxiliary receiver coil having a lower sensitivity than said main receiver coil connected in opposition to said main receiver coil and arranged on said beam structure in fixed relation to and at a fixed distance from said transmitter coil less than the distance from said main receiver coil to said transmitter coil to partially cancel, in said main receiver coil, the signal produced by the electromagnetic field created by said transmitter coil other than that produced as a result of field variations cause by the presence of an electrically conducting body.

9. A prospecting means as claimed in claim 8 in which said coils are arranged in coaxial relation.

10. A prospecting means as claimed in claim 9 in which said coaxially arranged coils are arranged substantially coaxial with the axis of said beam.

11. Means for prospecting for electrically conducting bodies comprising a longitudinal beam structure adapted to be towed by an aircraft, a low frequency alternating electromagnetic field source including a transmitter coil mounted on said beam structure adjacent one end and means to energize said transmitter coil, a receiver device including a main receiver coil mounted on said beam structure adjacent the other end, an auxiliary receiver coil mounted on said beam structure adjacent said transmitter coil, said coils being coaxially arranged and substantially coaxial with said beam structure, said auxiliary receiver coil being connected in opposition to said main receiver coil and having a sensitivity less than said main receiver coil substantially directly proportional to the cube of the relation that the distances of the main and receiver coils from the transmitter coil bear to each other whereby the auxiliary receiver coil substantially cancels out the signal generated in the main receiver coil by the transmitter coil other than those signals produced by an electrically conducting body in the vicinity, and means for recording variations in the resultant response from said detector coils.

12. Prospecting means as claimed in claim 11 in which said beam structure comprises a plurality of longitudinal stringers secured together by supporting struts and bulkheads into a longitudinal stiff open framework, a sheathing closing said open framework to form said beam, and stabilizing means carried by said beam including a wind sock connected to trail said beam.

13. Prospecting means as claimed in claim 12 in which a reference coil is mounted on said beam in coaxial relation to the aforesaid coils and is coupled to assist the auxiliary receiver coil in cancelling out a precise amount of pick up by said main receiver coil of the field created by said transmitting coil in the absence of an electrically conducting body in the vicinity.

14. Prospecting means as claimed in claim 13 in which means are provided to detect in the response of said detector coil, the response component in phase with said electromagnetic field created by said transmitting coil.

15. Prospecting means as claimed in claim 14 in which said receiver device includes a differentiating circuit to eliminate variations of the electromagnetic field as detected by said receiver coils having a period of a duration of several seconds and longer.

16. Apparatus for use in geophysical exploration from an aircraft comprising a transmitter coil to create a low frequency alternating electromagnetic field, a receiver coil, means for mounting said transmitter and receiver coils in a substantially coaxial relation so as to maintain a precisely accurate fixed relation relative to each other at all times, means for transporting said apparatus above the earth's surface, and means responsive to the signal generated in said receiver coil to indicate variations in the field received thereby.

17. A method of aerial prospecting for electrically conducting bodies from an aircraft comprising transporting therefrom a low frequency alternating electromagnetic field source and detector means for detecting variations in a field created by said source, while maintaining said source and detecting means in precisely accurate fixed relation relative to each other at all times during flight, detecting field variations detected by said detector means and transmitting these field variations measured to equipment in the aircraft.

18. Apparaus for use in geophysical exploration from an aircraft comprising a transmitter coil to create a low frequency alternating electromagnetic field, a receiver coil, means for mounting said transmitter and receiver coil in a substantially coaxial relation so as to maintain a precisely accurate fixed relation relative to each other at all times, means for transporting said apparatus above the earth's surface, means for passing an alternating exciting current through the said transmitter coil to set up a direct magnetic flux field through the receiver coil and an indirect flux field which links the earth, and means to substantially cancel out the signal generated in the main receiver coil by the transmitter coil other than those signals which link the earth and means responsive to the last mentioned signals to indicate variations in the field received thereby.

References Cited in the file of this patent

UNITED STATES PATENTS

| | | |
|---|---|---|
| 1,492,300 | Lowy | Apr. 29, 1924 |
| 1,812,392 | Auschlag | June 30, 1931 |
| 2,066,135 | Barret | Dec. 29, 1936 |
| 2,201,256 | Barret | May 21, 1940 |
| 2,539,270 | Puranen et al. | Jan. 23, 1951 |
| 2,559,586 | Bjarmason | July 10, 1951 |
| 2,636,924 | Lundberg et al. | Apr. 28, 1953 |
| 2,741,736 | Puranen | Apr. 10, 1956 |